United States Patent [19]

Danielsson, III

[11] Patent Number: 4,756,089
[45] Date of Patent: Jul. 12, 1988

[54] LINEAR DISPLACEMENT MEASURING DEVICE

[75] Inventor: Lennart Danielsson, III, Stockholm, Sweden

[73] Assignee: Car-O-Liner Company, Wixom, Mich.

[21] Appl. No.: 112,503

[22] Filed: Oct. 22, 1987

[51] Int. Cl.$^4$ .............................................. G01B 5/25
[52] U.S. Cl. ...................................... 33/503; 33/288; 33/608; 33/1 M
[58] Field of Search ................... 33/158, 159, 169 B, 33/169 C, 288, 178 B, 573, 536, 520, 203.2, 600, 608, 644, 645, 638, 641, 670, 671, 676, 1 M

[56] References Cited
U.S. PATENT DOCUMENTS 4,097,996  7/1978  Yamazawa et al. ................. 33/1 M
4,366,624  1/1983  Bergstrom ......................... 33/288 X
4,490,918  1/1985  Clausen ............................... 33/288

Primary Examiner—Harry N. Haroian
Attorney, Agent, or Firm—Barnes, Kisselle, Raisch, Choate, Whittemore & Hulbert

[57] ABSTRACT

An apparatus for measuring linear displacement having three slides movable along orthogonal axes. Two slides each having a scale for measuring linear displacement which extends substantially parallel to the path of movement of its associated slide. The third slide has a movable scale for measuring linear displacement, with a portion extending at substantially a right angle to the path of movement of the third slide, so that the linear displacement along all three axes can be viewed and read on all three scales from the same position and in substantially the same sighting direction.

11 Claims, 2 Drawing Sheets

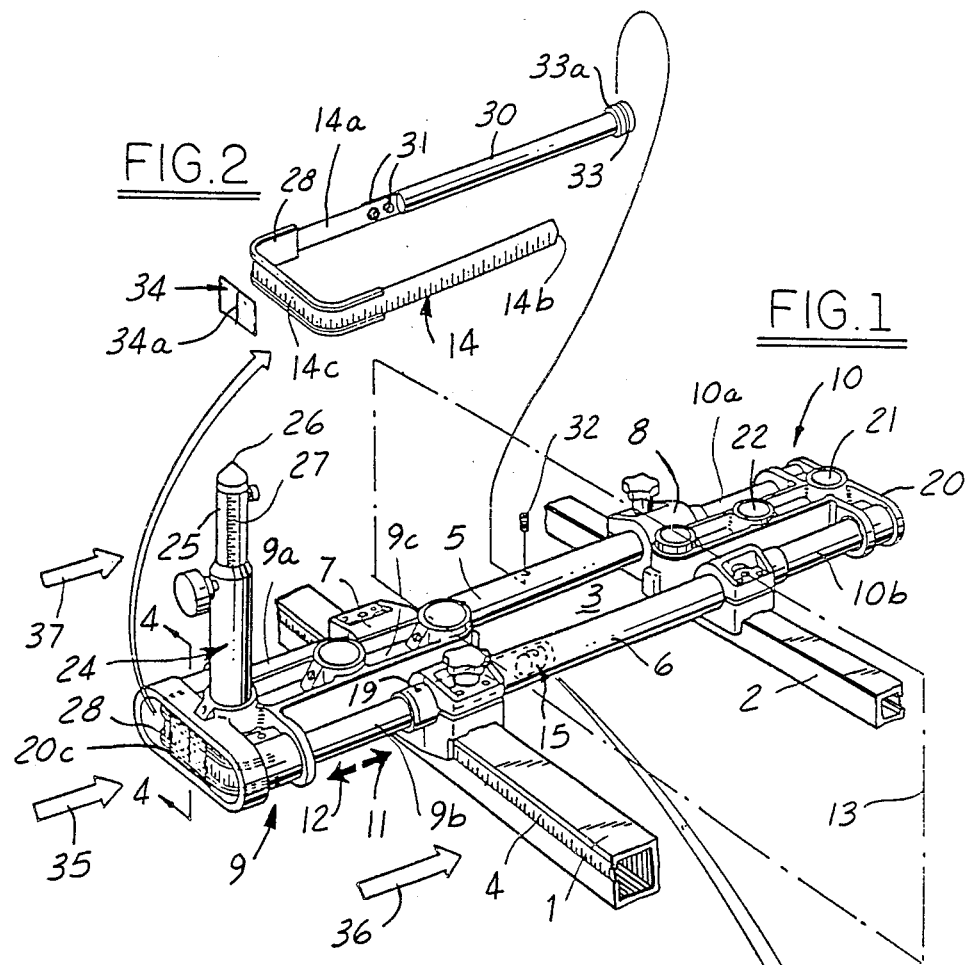

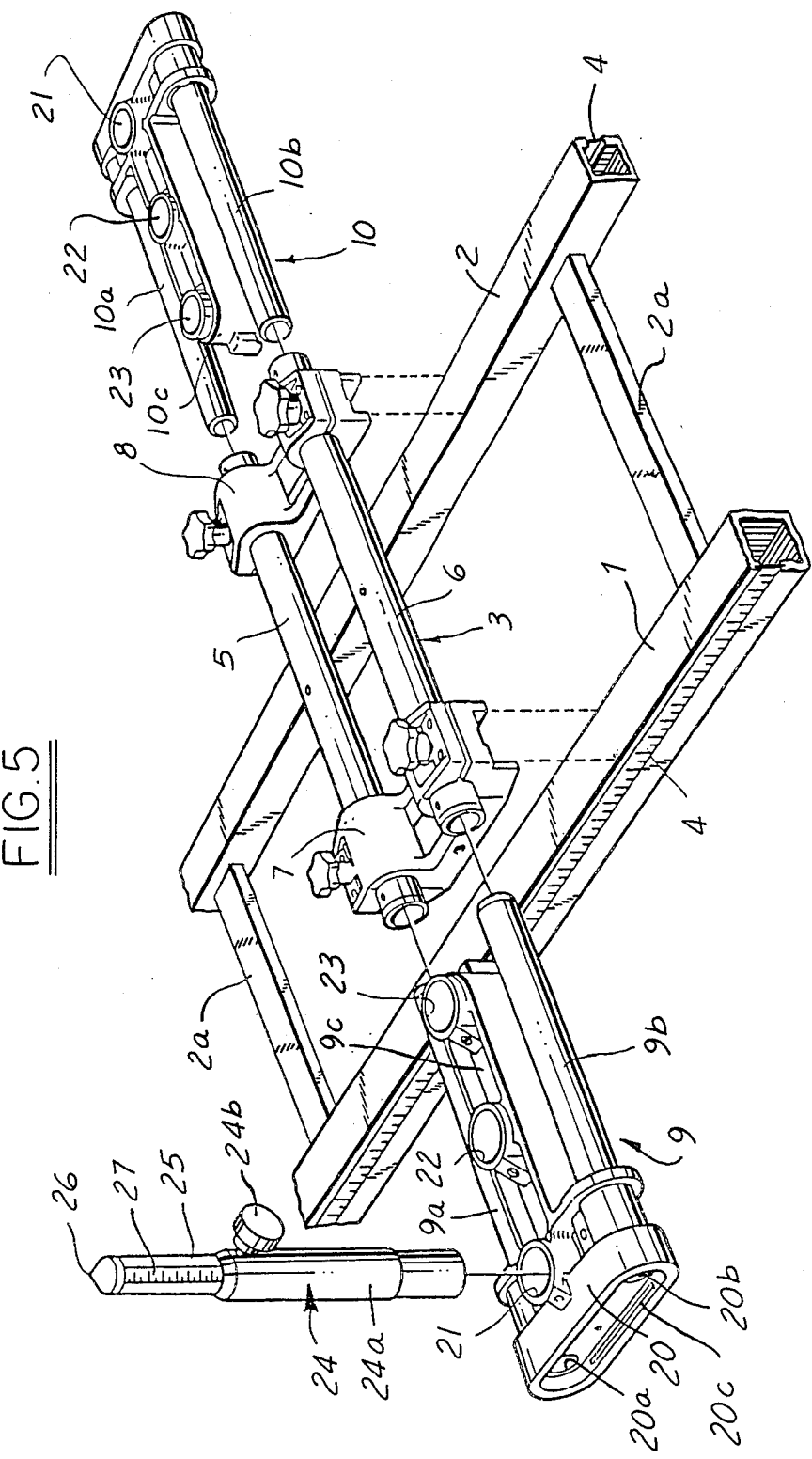

LINEAR DISPLACEMENT MEASURING DEVICE

FIELD OF THE INVENTION

The present invention relates to a measuring and checking apparatus for a body or chassis of a motor vehicle, and more particularly, to an apparatus in which the location of a point on a vehicle body or chassis can be measured along each of three orthogonal axes by an operator viewing the apparatus from one position and in one direction.

BACKGROUND

In the body and/or frame of every motor vehicle such as a car there are important control points or measuring points for various components the relative positions of which are exactly specified by the car manufacturer and established when the car is manufactured. Normally, for safe operation of the car, it is important that this orientation of various parts be maintained and that the correct orientation be re-established after damage has occurred to the car. After body work repairs have been carried out and also whenever there is reason to suspect that deformation has occurred after an accident, even a slight one, the position of the measurement points should be checked and, if necessary, corrected.

A known arrangement for checking and straightening vehicle bodies has a set-up bench in the form of a strong steel frame over which the vehicle to be examined is suspended with the aid of so-called body work clamps which are releasably locked to the sides of the bench and engage and support the body and/or frame of the vehicle at appropriate points. The bench is equipped with an accurately machined reference surface, preferably on the upper face of the bench, and on this surface a measuring rail system or a so-called measuring bridge is received. The measuring bridge has accurately parallel rails, transverse slides, and probes all equipped with scales. With the aid of this bridge points on the body or frame can be mesured along three orthogonal reference axes at right angles to each other which coincide with the longitudinal direction (x), transverse direction (y) and vertical direction (z) of the body and frame. The rails of the measuring bridge are first positioned relative to the body being examined, after which, by means of the slides, probes and scales, the location of the vehicle control points can be checked and measured. With the aid of the scales on the measuring bridge the spatial position of the measuring or control points can be determined. After comparison with the data from the manufacturer, it can be determined whether they are in the correct position or not.

These systems have drawbacks, however, in that it is often inconvenient, time consuming and difficult for the operator to accurately read the measurements registered on the scales, because the space available for this end is often relatively confined or restricted by the vehicle body and bench and because the operator has to bend and stoop forward towards the bridge, in order to take a reading. In addition to being physically difficult to use, these systems often result in inaccurate readings by the operator, because some of the scales are at right angles to each other, making it extremely difficult and often impossible for an operator to utilize a single sighting line at substantially a right angle to these scales for reading them which is necessary for accurate measurements.

SUMMARY OF THE INVENTION

In accordance with this invention, a measuring apparatus has a slide with a movable scale for measuring linear displacement with at least the part of the scale to be viewed and read extending at a right angle to the direction of movement of the slide. Preferably the apparatus has three slides for measuring linear displacement, movable in mutually perpendicular directions to each other. The other two slides preferably each have a scale for measuring linear displacement which extends substantially parallel to the direction of movement of its associated slide. Preferably all the slides and scales are constructed and arranged so that linear displacements in three mutually perpendicular directions can be read along substantially the same sighting direction.

Objects, features and advantages of this invention are to provide a linear displacement measuring device in which the location of a point relative to three orthogonal axes can be easily, quickly and accurately read by an operator, can be read from a single position, the measurements are more accurate and reliable, and the device is rugged, durable, of economical manufacture and assembly, and requires little service in use.

BRIEF DESCRIPTION OF THE DRAWINGS

These and other objects, features and advantages of this invention will be apparent from the following detailed description, appended claims and accompanying drawings in which:

FIG. 1 is a fragmentary perspective view of a measuring device embodying this invention;

FIG. 2 is an exploded view of a movable linear measuring scale mechanism of the device of FIG. 1;

FIG. 3 is a fragmentary sectional view of a catch of a measuring slide of the device of FIG. 1;

FIG. 4 is a sectional view taken generally on line A—A of FIG. 1, and illustrating a measuring tape and holder of the device of FIG. 1; and FIG. 5 is an enlarged and exploded perspective view of the device of FIG. 1, with the movable scale mechanism removed.

DETAILED DESCRIPTION

Referring in more detail to the drawings, FIGS. 1 and 5 illustrate a measuring device or bridge with a pair of elongate beams 1 and 2 maintained in fixed and spaced apart parallel relationship by crossbars 2a. To facilitate measuring the location of a point on a vehicle body, a movable carriage 3 is slidably received on the beams. From either side of the bridge, the position of the carriage can be determined by viewing the tape 4 with a graduated scale carried by each beam. The beams and crossbars are preferably made of steel or other metal. In use, the measuring bridge is placed underneath a vehicle and supported by a body chassis alignment or straightening bench or other generally horizontal support surface.

The carriage 3 has a pair of hollow cylindrical metal tubes 5 and 6 which are carried in parallel and spaced apart relationship to each other and perpendicular to the beams by a pair of metallic slide shoes 7 and 8 slidably received on and carried by the beams 1 and 2. Measuring slide assemblies 9 and 10 are slidably received by the carriage for rectilinear movement transversely or at a right angle to the path of movement of the carriage. Each slide 9 and 10 has a housing or end piece 20 with through bores 20a and 20b in which one end of a pair of hollow cylindrical tubes or legs 9a, 9b and 10a, 10b of metal, such as steel, one threaded clamped or otherwise secured. The legs of the slides are slidably or telescopically received in the opposed ends of the tubes 5 and 6 of the carriage.

Accidental or inadvertent removal of the slides from the carriage is prevented by a detent or catch 15 carried by at least one tube of each slide. As shown in FIG. 3, each catch has a tubular housing 16, in which a catch or bolt 18 is slidably received and yieldably biased by a spring 17 so that when the slide is extended sufficiently, it will project into a hole or recess 19 in an associated tube of the carriage. The catch housing is press fit into the end of the leg or tube of the slide.

A control point location detector or probe assembly 24 can be carried by each slide. The probe is removably receivable is any of three sockets or holes 21, 22 and 23 in a finger or leg 9c, 10c of each end housing which projects or extends between its associated slide tubes. Each probe has a gauge pin 25 with a concical tip 26 at one end for contacting the selected control point or location of the vehicle to be measured. Each gauge pin 25 is telescopically and slidably received in a sleeve-like housing 24a and can be raised and lowered vertically to engage and disengage the conical tip 26 with a location to be measured. The gauge pin 25 can be releasably retained at any desired height by a lock screw 24b. The vertical distance between the tip 26 of the pin and a reference such as the horizontal plane of the surface on which the bridge rests can be measured and determined by a graduated scale 27 on the pin which can be rotatably turned to face or orient the scale in any desired direction. The upper end of the sleeve housing provides an index line for the graduated scale.

The displacement or position of each slide 9 and 10 in a horizontal plane at a right angle to the beams and the direction of the carriage movement can be related to a reference position, such as a vertical plane 13 extending longitudinally of the measuring bridge and located centrally an equal distance between beams 1 and 2. In accordance with a feature of this invention, the position of each slide 9 and 10 in relation to the reference plane 13 is measured by and the measurement viewed and read on a measuring assembly received in the end housing 20 of each slide. Preferably, this measuring assembly is the same for both slides and thus will be described more fully only in connection with slide 9.

As shown in FIGS. 1 and 2, each slide measuring assembly has a movable tape 14 with a graduated scale slidably received in a holder or track 28 secured by screws 29 (FIG. 4) to the end housing 20. The track 28 is generally U-shaped with a smooth curve through ninety degrees adjacent each end so that in assembly its ends project into the bores 20a and 20b of the end housing 20 and are generally aligned with the central portions of the tubes 9a, 9b received therein. To entrap and retain the tape 14 in the curved track, its longitudinal edges have return bends through about 180° so that in assembly, the tape is slidably received in them, and entrapped between them while still providing sufficient spacing so that its graduations can be seen or viewed between the edges.

Preferably, the tape and the return bends of the track are dimensioned so that when the tape is received therein, it is slightly arched (as shown in FIG. 4) to impart additional stiffness or firmness to the tape to facilitate its being slidably moved or displaced through the track or holder.

As the slide is moved, to impart movement of the tape relative to the track, one end 14a of the tape is connected by a rigid rod 30 to a tube 5 or 6 of the carriage. One end 14a of the tape and rod are connected together by fasteners, such as screws or rivets 31, and the other end of the rod 30 is secured to the tube by a set screw 32 which engages a groove 33 in an enlarged collar 33a secured to the other end of the rod. In assembly, the other end 14b of the tape projects into the tube 9b and when the slide is moved runs through the tube.

To provide an index or reference line for reading the tape, a blank or index plate 34 of a transparent material, such as plastic, with an opaque reference line 34a on it is received in grooves 20c in the housing. The plate 34 lies in front of the portion of the tape in the bight or central part of the holder or guide track 28. Preferably, to facilitate establishing an initial reference point, the index plate 34 can be moved in the grooves 20c relative to the central portion 14c of the tape in the track. In use the central portion 14c of the tape can be viewed and read from the end of the slide.

When using the bridge to determine the location of a reference or control point on a vehicle body, the tape 14 associated with each slide 9 and 10 can be easily viewed and read to determine the distance along the Y axis from the reference plane 13 to the associated probe assembly 24 by viewing and reading the tape from beyond the outer or free end of the slide, which is remote from the vehicle to be measured, by sighting or viewing the tape in the direction indicated by the arrow 35 in FIG. 1. From the same position, the tape 4 on the adjacent beam 1 or 2 can also be viewed and read by sighting or viewing in the direction indicated by arrow 36 to obtain a measurement along the X axis parallel to the beams. Similarly, from the same position, the scale 27 on the probe 25 can be viewed and read by sighting or viewing it in the direction indicated by the arrow 37 to measure the vertical distance along the Z axis to the tip 26 of the probe. Therefore, an operator is able stand in front of the free end of the slide and from the same position read all three tapes or scales 4, 14 and 27 along essentially parallel lines of sight 35, 36 and 37 which are at essentially a right angle to each of the scales, even though the scales relate to measurements along three othognal coordinates X, Y and Z.

Preferably, the tape 14 is graduated and calibrated for use with a probe received in the outermost socket 21 of the slide. Consequently, when the probe is placed in either of the other two sockets 22 and 23, it is necessary to adjust the measurement registered or indicated on the tape 14 by a correction factor corresponding to the distance between the axis of such socket and the axis of the socket 21. For example, if the axes of the sockets 22 and 23 are spaced 100 mm and 200 mm respectively from the axis of the socket 21, the correction factor for the socket 22 will be 100 mm and the socket 23 will be 200 mm.

I claim:

1. An apparatus for measuring along at least two axes at right angles to each other comprising:
   at least one elongated beam,
   a carriage slidably carried by said beam for rectilinear movement along said beam,
   a slide carried by said carriage for rectilinear movement with respect to said beam along a path perpendicular to the path of movement of said carriage along said beam, a first calibrated measuring scale carried by and extending longitudinally of said beam for measuring displacement along said beam, a second calibrated measuring scale which is elongate, inextensible, at least somewhat flexible and operably connected to said carriage, and a scale guide carried by said slide, slidably receiving a portion of said second scale and contructed and arranged to deflect a portion of the scale when received therein unto a path perpendicular to the path of rectilinear movement of said slide so that such portion of such second scale and an adjacent portion of said first scale can both be viewed from the same location and in substantially the same sighting direction to thereby view and read both scales from the same location.

2. An apparatus for measuring along three orthognal axes comprising:

a pair of elongate beams spaced apart and in parallel and fixed relationship to each other, a carriage slidably carried by said beams, a first calibrated measuring scale carried by at least one of said beams and extending longitudinally thereof for measuring displacement along such one beam, at least one slide carried by said carriage and constructed and arranged to be extended and retracted with respect to said carriage along a rectilinear path perpendicular to the longitudinal axis of such one beam, a second calibrated measuring scale for measuring displacement of said slide which is elongate, inextensible, at least somewhat flexible, and operably connected to said carriage, a holder carried by said slide, slidably receiving a portion of said second scale, and guiding portions of said second scale along a generally U-shaped path with at least part of the central portion thereof lying both parallel to the longitudinal axis of such one beam and perpendicular to the rectilinear path of travel of said slide;

a probe carried by said slide, with its longitudinal axis extending perpendicular to both the longitudinal axis of said one beam and the rectilinear path of travel of said slide, a third calibrated measuring scale extending longitudinally of said probe for measuring longitudinal displacement of said probe, and all three of said scales constructed and arranged such that they can be viewed and read from the same location outboard of the free end of said slide and in substantially the same sighting direction.

3. An apparatus for measuring along three orthogonal axes comprising:

two elongate beams spaced apart in parallel and fixed relationship to each other;

a carriage slidably carried by said beams and having two spaced apart hollow cylindrical tubes extending perpendicularly to said beams;

a first calibrated measuring scale carried by one of said beams for measuring displacement along such beam;

at least one generally U-shaped measuring slide, slidably received in said carriage tubes;

a second calibrated measuring scale for measuring displacement of said slide which scale is elongate, inextensible, at least somewhat flexible and operably connected to said carriage, a guide for guiding at least a portion of said second scale to move along a path perpendicular to the path of movement of the slide and constructed and arranged to be viewed in substantially the same sighting direction as the first scale; and a probe carried by said slide and having a third calibrated measuring scale for measuring displacement along a path perpendicular to both the path of said carriage and the path of said slide and constructed and arranged to be viewable from substantially the same sighting direction as the first and second scales.

4. The apparatus of claim 3 wherein said carriage is mounted on each said beam by a shoe constructed and arranged to maintain the axes of said hollow cylindrical tubes in parallel relationship to each other and perpendicular to the longitudinal axis of the beam.

5. The apparatus of claim 3 wherein said U-shaped measuring slide comprises an end housing and two parallel and spaced apart hollow cylindrical tubes each having one end secured to said end housing and the other end slidably received in one of said carriage tubes.

6. The apparatus of claim 5 wherein said guide comprises a holder for such second measuring scale secured to said end housing.

7. The apparatus of claim 6 wherein said holder comprises an elongate plate with longitudinal edges having return bends such that the second scale is received between the bent edges while being arched about its longitudinal axis and is slidably received in such holder and guided thereby and wherein the bent longitudinal edges of the holder are spaced apart sufficiently to permit viewing of the calibrations on such second scale.

8. The apparatus of claim 7 wherein said holder adjacent each end has a smooth curve through about 90 degrees and each end is generally aligned with and extends toward one of said tubes secured to said end housing.

9. The apparatus of claim 8 wherein said second scale passes through said holder and has one end extending into and operably connected to one of said carriage tubes and the other end freely extending into the tube of said slide received in the other of said carriage tubes.

10. The apparatus of claim 3 wherein said probe has a gauge pin slidably received in a housing sleeve, a tip on said pin and said scale of said probe extends longitudinally on said pin.

11. The apparatus of claim 10 wherein said end housing has a center leg extending between said tubes connected to said housing, and at least two spaced apart sockets in said center leg for selectively receiving said housing sleeve of said probe.

* * * * *